Jan. 7, 1958  H. J. NEIDHART  2,819,063
RESILIENT SUPPORTS
Filed July 13, 1956

INVENTOR
*Hermann J. Neidhart*
BY Ely, Pearne & Gordon
ATTORNEYS

United States Patent Office 2,819,063
Patented Jan. 7, 1958

2,819,063

RESILIENT SUPPORTS

Hermann J. Neidhart, Geneva, Switzerland

Application July 13, 1956, Serial No. 597,618

Claims priority, application Switzerland
September 23, 1948

12 Claims. (Cl. 267—63)

This invention relates to resilient supports and particularly to support structures for resiliently mounting one mechanical or structural member on another for relative reciprocation with resilient or elastic rollers of rubberlike material providing the supporting connection between the members. This application is a continuation-in-part of my copending application Serial No. 117,048, filed September 21, 1949 (now abandoned), which was based upon a corresponding application filed in Switzerland on September 23, 1948, the benefit of the filing date in Switzerland being claimed for this application.

Rubberlike bodies, such as rollers, have been used in a variety of ways to cushion or dampen the relative movement of mechanical or structural members, such as a vehicle chassis and axle, for example. However, such prior arrangements have all possessed certain manufacturing disadvantages or operational characteristics which have rendered them unsatisfactory or have limited their fields of usefulness.

For example, devices are known which have flexible rolling members that roll along surfaces in accordance with the pressure exerted on them, these surfaces converging in the direction of the pressure but having special recesses, hollows, channels, or the like, in which the rubber inserts rest when they are relieved of load, so that when the flexible inserts roll out of their positions of rest in consequence of loading, a rapidly increasing counter-pressure arises, while, with continuation of the movement, the increase in pressure is relatively slighter. In consequence of the special shape of the parts movable with respect to each other, the diagram of the variation in pressure at first progressively increases to a great extent, after which comes an abrupt change and then a renewed flatter-running increase.

As another example, a cone has been supported on the inner surface of a rubber torus carried in a conical cup whereby movement of the cone into the cup causes the torus to roll toward an inside-out condition. Only limited rolling of this character is possible without producing abrupt changes in the load-deflection characteristics of such devices.

Modern springing techniques have sought, as a desirable type of spring action, relatively large amplitude and a load-deflection curve that is free from sudden changes in direction or sharp bending. While various spring systems have produced the desired load-deflection relationships, they are often mechanically complex and expensive to manufacture and maintain, or are subject to wear and mechanical failure, or are not adapted to be easily modified in production to meet a sufficiently wide range of loading conditions.

In contrast to the particular examples mentioned, the present invention provides a simple support construction that is inexpensive to manufacture and maintain, that is adapted to accommodate relatively large amplitudes of relative movement, that has a smooth load-deflection curve which may be a straight line or have almost any desired degree of convexity or concavity over any or all of its length, that suffers little wear in use, that requires no lubrication, that may provide a controllable resistance to recoil or rebound, and that has many other desirable features for heavy duty as well as light duty spring suspension systems and the like.

The objects of the invention are to provide a resilient support employing elastic rollers of rubberlike material as the sole resistance to relative movement while achieving all of the foregoing characteristics and advantages.

The objects of the invention are accomplished by a unique arrangement of a wedge on one member and a socket of generally complementary configuration on the other member, and with rubberlike rollers, which may be balls or circular cylinders, disposed between the walls of the wedge member and socket for progressive compression while rolling in response to reciprocation of the two members. The character of the invention and the manner in which the foregoing objects are achieved will more fully appear from the following description of preferred, illustrative embodiments of the invention. These embodiments of the invention are somewhat diagrammatically shown in the accompanying drawings in which:

Figure 6:
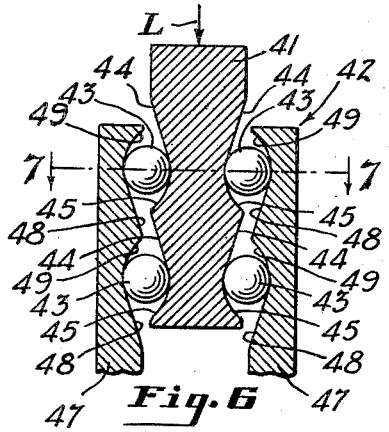
Figure 6 is a simplified view similar to Figure 1 of another modified arrangement of inner and outer roller-engaging members.
Figure 8:
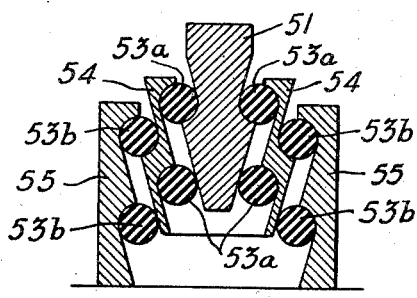
Figure 7:
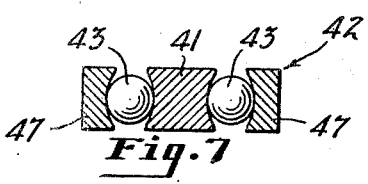

Figure 7 is a simplified, horizontal, cross-sectional view of the device of Figure 6, taken as indicated by the line 7—7 in Figure 6 and showing how the device of Figure 6, or of any of the other embodiments of the invention, may be adapted to the use of normally spherical, rather than cylindrical, rollers or cushioning elements; and Figure 8 is a simplified, vertical, cross-sectional view of still another embodiment of the invention illustrating how additional sets of cushioning rollers and roller-engaging surfaces may be incorporated in such a way as to double the maximum amplitude of reciprocation of the innermost and outermost members.

Figure 1:
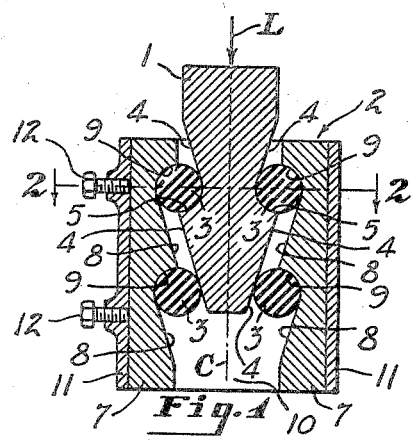
Figure 1 is a vertical cross-sectional view of an embodiment of the invention when the load L thereon is zero.
Figure 3:
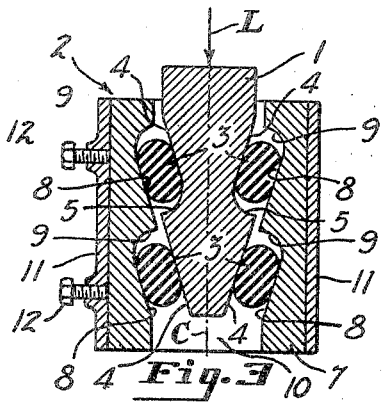
Figure 3 is a view similar to Figure 1 showing the same device after a load L has been applied thereto for causing relative movement of the inner and outer members.
Figure 2:
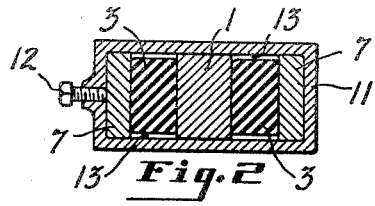
Figure 2 is a horizontal cross-sectional view of the device of Figure 1, taken as indicated by the line 2—2 in Figure 1.

Referring first to Figures 1-3, an inner member 1 and an outer member, generally designated 2, are arranged for relative reciprocation along a vertical path. A plurality of elastic rollers 3 of rubberlike material are disposed between the inner member 1 and the outer member 2 for elastically resisting downward movement of the inner member relative to the outer member.

The inner member 1 is provided with oppositely facing tapered surfaces 4 so as to provide a vertically spaced pair of upper and lower wedge-like portions, each being disposed between a pair of substantially identical horizontally aligned rollers 3. The uppermost of these wedge shaped portions of the inner member terminates at its lower end in a pair of oppositely converging surface portions 5 which are shaped to form more abrupt wedges for limiting reverse relative movement of the inner and outer members in the nature of a rebound when a load L is suddenly removed.

The outer member 2 in this embodiment of the invention comprises a pair of blocks 7 that provide oppositely converging roller engaging surfaces 8 and 9 and a passageway 10 between the blocks within which the inner member 1 may reciprocate. The roller-engaging surfaces 8 and 9 are of generally similar contour to the surfaces 4 and 5, respectively, of the inner member, but are inverted with respect thereto. The blocks 7 are held in engagement with the rollers 3 by an outer sleeve 11 provided with adjusting screws 12 for forcing the blocks of the outer member toward each other to apply a desired degree of radial pre-compression to the rollers 3 when the elements of the structure are disposed in relative positions of equilibrium corresponding to the no-load condition shown in Figures 1 and 2, i. e., where the load L tending to force the inner member downwardly with respect to the outer member is zero.

As the rollers are radially compressed, they are also axially elongated to some extent. Therefore, some clearance 13 should be provided between the ends of the rollers and the adjacent walls of the sleeve 11.

Figure 3 shows the device of Figures 1 and 2 after a substantial load L has been applied and indicates how downward movement of the inner member 1 relative to the outer member 2 is elastically resisted by the rollers 3, which roll along the confining surfaces of the inner and outer members while being subjected to a constantly and relatively uniformly increasing radial pressure, with corresponding distortion of their cross-sectional shape.

In this and other embodiments of the invention hereinafter described, the inner member is thus mounted for relative reciprocation of considerable amplitude along a predetermined, substantially rectilinear path indicated by the load arrow L and by a centerline C. The inner and outer members are symmetrical with reference to a median plane through the centerline C and parallel to the axes of the rollers 3. Each horizontally aligned pair of rollers 3 is confined between the spaced wall portions of the outer member, which define first and second pairs of inwardly facing surfaces 8 and 9, and the opposite sides of the inner member, which define third and fourth pairs of outwardly facing surfaces 4 and 5, whereby, depending upon the direction of relative movement of the inner and outer members along said predetermined path, the rollers of each horizontally aligned pair thereof are compressed between and roll along said first and third pairs of similarly converging surfaces 4 and 8 or said second and fourth pairs of similarly converging surfaces 5 and 9. The elasticity of the rollers 3, which are preferably circular in cross-section when unstressed, tends at all times to urge the inner and outer members to the relative positions of equilibrium shown in Figure 1, in which the rollers engage the confining surfaces of the outer member in the region of their greatest separation and engage the confining surfaces of the inner member in the region of their minimum separation. While additional structure (not shown) may be incorporated in the device to positively limit relative movement of the inner and outer members in either direction beyond opposite extremes of their path of travel, such structure will preferably so function only in the event of an overload of the device. Normally, resistance of the rollers 3 constitutes the only resistance to relative movement of the inner and outer members along said path in either direction from the no-load position of equilibrium shown in Figure 1.

From inspection of the shapes of the roller-confining surfaces 4 and 8 of the inner and outer members, respectively, it will be apparent that relative movement of the inner and outer members as a load L is applied will cause a progressive gradual increase in the resistance of the rollers 3 to such movement. When these surfaces 4 and 8 are substantially plane surfaces, as shown in Figure 1, the load-deflection curve will have no abrupt bends as the load L is increased. The precise shape of the curve will be determined by the elastic characteristics of the rubberlike material of which the cushions are made, for any given configuration and spacing of the roller-confining members. The slope of this curve may be varied by adjusting the angle of convergence of this roller-confining surfaces of the inner and outer members, the spacing therebetween (with corresponding change in roller diameter), and the amount of radial pre-compression of the rollers, as will be apparent to one skilled in the art.

To a great extent, all of these factors may be adjusted to provide a prescribed load-deflection curve desired for a particular type of loading condition to give particular spring characteristics.

In general, suitable load-deflection curves will be obtainable where each pair of opposing surfaces 4 and 8 between which a roller 3 is confined are both planar and parallel, as shown in Figures 1 and 2. This is desired primarily to minimize the number of variables to be considered in the design of devices to meet different service requirements. However, where helpful in order to obtain a load-deflection curve of a prescribed shape, the surfaces 4 may make a different angle with a median plane than the surfaces 8, and either or both of the sets of surfaces 4 and sets of surfaces 8, to a limited degree, may be convexly curved or concavely curved, or may be reversely curved so as to be partly concave and partly convex. The requirements of the invention in this respect are that the selected surface configurations be symmetrical with respect to a median plane of the device, that they be selected to progressively further compress the rollers with each added increment of load, and preferably, that the confining surfaces for each horizontally aligned pair of rollers be so matched with the confining surfaces for other similar pairs of rollers in the same device that all of the rollers are simultaneously subjected to substantially the same compressing and rolling action.

As will also be apparent from inspection of the shapes of the roller-confining surfaces 5 and 9, reverse movement of the inner and outer members 1 and 2 from the condition shown in Figure 2, when a load L is removed, will be abruptly snubbed by a relatively rapid compression of the rollers 3 with each increment of reverse movement from the equilibrium condition shown in Figure 1. In this embodiment of the invention, the confining surfaces 5 and 9 are curved to substantially conform to the cylindrical contour of the rollers 3 when unstressed so as to provide maximum snubbing action and minimum (virtually zero) rolling of the rollers along these surfaces from the equilibrium condition.

Figure 4:
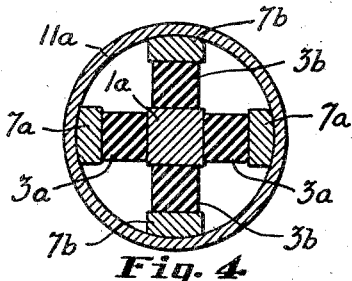
Figure 4 is a view similar to Figure 2 showing how the device of Figures 1-3 may be modified to incorporate additional sets of cushioning rollers and roller-engaging surfaces.

Referring next to Figure 4, a modified form of the device of Figures 1–3 is shown wherein two pairs of horizontally aligned, opposed rollers 3a and 3b may be arranged about the same inner member 1a. In this case, two sets of blocks 7a and 7b may be included in the outer member 2a and held in place by an encircling annular sleeve 11a of suitable cross-sectional configuration.

In the device of Figure 4, the disposition of rollers on four sides of the inner member provides a cushioned resistance to side thrust in any direction, as well as to reciprocation in the manner of the device of Figures 1–3. Any desired means, such as sets of adjusting screws (not shown), may obviously be applied similarly to the arrangement in Figures 1–3 to provide for inward movement of some or all of the blocks 7a and 7b to pre-compress the rollers 3a and 3b and to provide for some lateral adjustment of the position of the inner member 1a.

Figure 5:
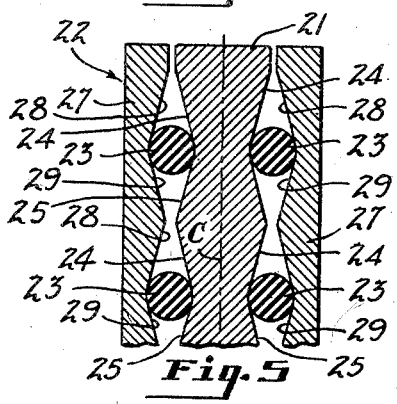
Figure 5 is a simplified view, similar to Figure 1, of a modified arrangement of inner and outer roller-engaging members.

Referring next to Figure 5, another modification is illustrated which is basically the same as the device of Figures 1–3. In this case, however, roller-engaging surfaces 24 and 25 on an inner member 21 are of identical contour and length and roller-engaging surfaces 28 and 29 on blocks 27 of an outer member 22 are of identical contour and length and are complementary to the surfaces 24 and 25. Thus, the rollers 23 are compressed and roll the same amount for a given distance of relative movement of the inner and outer members in either direction along the centerline C. This renders the spring action of the device, and hence the loading of the device, reversible.

Referring next to Figures 6 and 7, another modification is shown which is basically the same as the device of Figures 1–3. In this case, roller-engaging surfaces 44 and 45 on an inner member 41 have different contours and lengths; and roller-engaging surfaces 48 and 49 on blocks 47 of an outer member 42 have different contours and lengths, but are respectively identical, though inverted, relative to the surfaces 44 and 45. The surfaces 45 and 49 are concavely curved with a gradually increasing curvature to provide less abrupt snubbing during reverse movement or rebound than the corresponding surfaces 5 and 9 in Figures 1–3. The springing characteristics for loading in one direction are, therefore, quite different from the characteristics for loading in the opposite direction, but sudden changes in the load-deflection curve are nevertheless avoided even during rebound resulting from removal of the load indicated by the arrow L. This form of roller-engaging surfaces is particularly suited to the springing of heavy masses which cannot be so abruptly snubbed on rebound.

Figures 6 and 7 also show how spherical or ellipsoidal rollers 43 or the like may be employed in place of cylindrical rollers. Lateral displacement of such rollers may be restrained by giving the roller-engaging surfaces shallow, trough-like contours as viewed in transverse section in Figure 7. Obviously this feature of the invention may be applied to the other forms of the invention shown and described herein, though the use of cylindrical rollers is generally preferred.

Figure 8 illustrates another way in which additional pairs or sets of roller and roller-confining surfaces may be incorporated in a resilient support in accordance with the invention. In this case, the inner member 51 corresponds generally to the inner member 1 of Figures 1–3. Sets of rollers 53a engaging the inner member 51 are confined in contact therewith by blocks 54. These blocks may or may not be connected at either side (not illustrated) as an integral structure corresponding to the outer member 2 of Figures 1–3. In addition to serving together as an outer member for the rollers 53a, the blocks 54 serve together as an inner member for engaging additional sets of rollers 53b, which are confined in contact with the blocks 54 by an outer pair of blocks 55. The blocks 55 are rigidly connected in any desired manner as an integral structure for holding the assembly together. This scheme for multiplying the number of sets of rollers increases the length of the path of relative reciprocation of the innermost and outermost members, compared to the device of Figures 1–3, without increasing the overall lengths of the roller-confining members. Also, as a result of the doubled number of rollers and relatively short paths of roller travel per unit of deflection, the diameter of the rollers required to carry a given load while providing the relatively long path of reciprocation is reduced compared to the diameter of the rollers in the form of device illustrated by Figures 1–3.

As will be apparent, all of the forms of the invention illustrated and described herein may be constructed to provide the same kind of elastic resistance to rectilinear motion when utilizing but one pair of rollers for connecting an inner and outer member. However, this normally requires some additional mechanical structure, such as sliding guides or the like, to restrain the inner and outer members to rectilinear travel, i. e., to prevent relative twisting of the inner and outer members. When using two (or more) vertically spaced pairs of rollers, as in Figures 1–3, twisting about one axis is elastically resisted by the device itself; and when using two (or more) vertically spaced rollers on each of the four sides of an inner member (as in Figure 4) on two opposite sides of an innermost member and on the other two opposite sides of an intermediate member (variant of Figure 8), twisting about any axis normal to the path of relative rectilinear travel is elastically resisted. Obviously, lateral displacement of the inner member relative to the outer member in directions normal to the roller axis is elastically resisted in all cases.

It will also be apparent that an inner and an outer member may be lengthened indefinitely in the direction of their relative rectilinear travel and may be provided with any desired number of vertically spaced sets of rollers and cooperating roller-confining surfaces to increase the load carrying capacity of a device without lengthening the amplitude of relative reciprocation or altering the size or character of the rollers.

While the invention has been illustrated by treating the load L as zero when the devices are in the so-called no-load positions of equilibrium, this ignores the weight of the inner member and any fixed load carried thereby. In practice, there will usually be such a fixed load (as in vehicle suspension systems). In such cases, the number, diameter, or lengths of the rollers, or the stiffness of the elastic material of which the rollers are made, or any combination or all of these factors, may be selected to maintain the rollers substantially in the actual no-load condition of equilibrium even under the fixed load. In this case, the resistance to rebound commences substantially at the actual no-load condition of the parts. Alternatively, the same factors may be selected so that the fixed load causes substantial initial deflection, in which case, rebound is assisted by the elasticity of the rollers until the parts reach the actual no-load condition, whereupon resistance to further rebound commences. The latter situation, of course, requires a longer device to accommodate the greater amplitude of rebound, and this is usually not desired.

While the amount of pre-compression of the rollers when the devices are in an actual no-load condition may be slight in some instances, it should never reach zero, so that the rollers are at all times under sufficient radial compression to prevent any slip between them and the surfaces on which they roll. Any such slip between the rollers and their confining surfaces is likely to cause irregularities in the action of the device or even a tilting of the rollers so that they can no longer roll in the direction of convergence and divergence of the confining surfaces. Thus, a substantial degree of pre-compression of the rollers when the device is in its actual no-load condition of equilibrium is a practical necessity.

While the invention has been disclosed herein with detailed reference to a number of illustrative embodiments, it will be appreciated that numerous variants of these embodiments will occur to those skilled in the art. Accordingly, the invention is limited only as required by the terms of the appended claims.

What is claimed is:

1. A support structure for resiliently mounting one member on another for relative reciprocation along a predetermined substantially rectilinear path, comprising an outer member that is symmetrical with reference to a median plane parallel to said path and has a pair of spaced wall portions defining a first pair of inwardly facing surfaces that converge in one direction along said path toward said plane; said first pair of surfaces, in the region of their greatest separation, merging into a second pair of inwardly facing surfaces that converge in the opposite direction along said path toward said plane; an inner member disposed between said wall surfaces of said outer member, said inner member being symmetrical with reference to said plane and having opposite sides defining a third pair of surfaces respectively facing outwardly toward said first pair and converging in the same direction toward said plane; and said third pair of surfaces, in the region of their minimum separation, merging into a fourth pair of surfaces that converge in said opposite direction toward said plane; and a pair of substantially identical solid elastic rollers of rubberlike material and of circular cross-section when unstressed disposed on opposite sides of said inner member, each of said rollers, when said support is unloaded, being confined under appreciable radial compression in positions of equilibrium between said surfaces of said outer member and said surfaces of said inner member with said rollers simultaneously rollably engaging said surfaces of said outer member in the region of their greatest separation and said surfaces of said inner member in the region of their minimum separation, whereby relative movement of said members in either direction along said path will be yieldingly resisted only by increasing radial compression of said rollers as they roll along and between said first and third pairs of surfaces or said second and fourth pairs of surfaces, depending upon the direction of said movement; said support structure having at least two such sets of rollers and confining surfaces spaced along said path with all of said rollers being under substantially identical degrees of radial compression at all positions of said members along said path, whereby the spaced sets of rollers and confining surfaces elastically resist relative oscillation or twisting of said members about axes normal to said predetermined path and parallel to said median plane.

2. A support structure according to claim 1 in which said first and third pairs of surfaces converge substantially uniformly toward said median plane over the lengths thereof traversed by said rollers.

3. A support structure according to claim 1 in which said first and third pairs of surfaces converge substantially uniformly toward said median plane over the lengths thereof traversed by said rollers, and said second and fourth pairs of surfaces converge more abruptly toward said median plane to provide greater resistance to relative movement of said members in one direction along said path than in the opposite direction.

4. A support structure according to claim 1 in which said first and third pairs of surfaces converge substantially uniformly toward said median plane over the lengths thereof traversed by said rollers, and said second and fourth pairs of surfaces converge at substantially the same rate as said first and third pairs of surfaces to provide substantially equal resistance to relative movement of said members in either direction along said path.

5. A support structure according to claim 1 in which said second and fourth pairs of surfaces converge toward said median plane more abruptly than said first and third pairs of surfaces to provide greater resistance to movement of said members in one direction along said path than in the opposite direction.

6. A support structure according to claim 1 in which said second and fourth pairs of surfaces converge at substantially the same rate as said first and third pairs of surfaces to provide substantially equal resistance to relative movement of said members in either direction along said path.

7. A support structure according to claim 1 in which said first pair of surfaces are substantially planar except where they merge into said second pair of surfaces and said rollers are substantially circular cylinders when unstressed.

8. A support structure according to claim 1 in which said first pair of surfaces are substantially planar except where they merge into said second pair of surfaces and said rollers are substantially circular cylinders when unstressed, the region of mergence having a curvature substantially conforming to the unstressed cylindrical curvature of said rollers.

9. A support structure according to claim 1 in which said first pair of surfaces are substantially planar except where they merge into said second pair of surfaces and said rollers are substantially circular cylinders when unstressed, the region of mergence having a curvature substantially conforming to the unstressed cylindrical curvature of said rollers, and said second and fourth pairs of surfaces being substantially cylindrical and having a curvature substantially conforming to the unstressed cylindrical curvature of said rollers.

10. A support structure according to claim 1 in which said first and third pairs of surfaces are substantially planar and are inclined at substantially equal angles to said median plane, except where they respectively merge into said second and fourth pairs of surfaces.

11. A support structure according to claim 1 in which said first and third pairs of surfaces are substantially planar and are inclined at substantially equal angles to said median plane, except where they respectively merge into said second and fourth pairs of surfaces and said rollers are substantially circular cylinders when unstressed, and the regions of mergence of each pair of said surfaces with another have curvatures substantially conforming to the unstressed cylindrical curvature of said rollers.

12. A support structure according to claim 1 in which the minimum distance between said spaced wall portions of said outer member exceeds the maximum distance between said opposite sides of said inner member by a fraction of the radius of said rollers selected to prevent withdrawal of the inner member from the outer member without radial compression and distortion of said rollers beyond their elastic limit.

References Cited in the file of this patent

UNITED STATES PATENTS

| 1,425,616 | Tarbox | Aug. 15, 1922 |
| 2,189,870 | Sluyter | Feb. 13, 1940 |
| 2,462,011 | Thiry | Feb. 15, 1949 |

FOREIGN PATENTS

| 933,174 | France | Dec. 17, 1947 |

(Corresponding U. S. 2,496,770, Feb. 7, 1950)